(12) United States Patent
Tsuruta et al.

(10) Patent No.: US 11,472,325 B1
(45) Date of Patent: *Oct. 18, 2022

(54) ACTUATOR FOR A SUPPORT SYSTEM OF A SEAT

(71) Applicant: Toyota Motor Engineering & Manufacturing North America, Inc., Plano, TX (US)

(72) Inventors: Ryohei Tsuruta, Ann Arbor, MI (US); Brian J. Pinkelman, Ann Arbor, MI (US); Umesh N. Gandhi, Farmington Hills, MI (US); Paul A. Gilmore, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/217,126

(22) Filed: Mar. 30, 2021

(51) Int. Cl.
*F03G 7/06* (2006.01)
*B60N 2/90* (2018.01)
*B60N 2/806* (2018.01)

(52) U.S. Cl.
CPC .............. *B60N 2/99* (2018.02); *B60N 2/806* (2018.02); *F03G 7/065* (2013.01); *F05C 2251/08* (2013.01)

(58) Field of Classification Search
CPC ........ B60N 2/99; B60N 2/4235; B60N 2/986; B60N 2002/0256; F03G 7/065
See application file for complete search history.

(56) References Cited

U.S. PATENT DOCUMENTS

| | | | |
|---|---|---|---|
| 7,093,903 B2 | 8/2006 | O'Connor et al. | |
| 7,256,518 B2* | 8/2007 | Gummin | F03G 7/065 60/527 |
| 7,448,678 B2 | 11/2008 | Browne et al. | |
| 7,476,224 B2* | 1/2009 | Petrakis | G01K 5/483 604/890.1 |
| 7,556,313 B2 | 7/2009 | Browne et al. | |
| 7,594,697 B2 | 9/2009 | Browne et al. | |
| 7,766,423 B2 | 8/2010 | Alexander et al. | |
| 7,883,148 B2 | 2/2011 | Alexander et al. | |
| 8,584,456 B1 | 11/2013 | McKnight | |

(Continued)

FOREIGN PATENT DOCUMENTS

| | | |
|---|---|---|
| WO | 2009111362 A2 | 9/2009 |
| WO | 2020183360 A1 | 9/2020 |

OTHER PUBLICATIONS

Dieter Stoeckel, "Shape memory actuators for automotive applications," Materials & Design, vol. 11, No. 6, pp. 302-307, Dec. 1990.

(Continued)

*Primary Examiner* — Shafiq Mian
(74) *Attorney, Agent, or Firm* — Christopher G. Darrow; Darrow Mustafa PC

(57) ABSTRACT

Systems and methods described herein relate to improving an actuator for a support system of a seat. In one embodiment, an actuator includes a body that is bi-stable with a coiled state and an uncoiled state. The actuator also includes a strip, coupled to the body, that coils the body according to heat caused by a power source. The actuator also includes a wire coupled to a side of the body opposite from the strip and the wire uncoils the body in response to heating caused by the power source.

20 Claims, 5 Drawing Sheets

(56) References Cited

U.S. PATENT DOCUMENTS

| | | | |
|---|---|---|---|
| 8,894,142 B2 | 11/2014 | Alexander et al. | |
| 2004/0035108 A1* | 2/2004 | Szilagyi | B25J 9/1085 |
| | | | 60/527 |
| 2006/0201149 A1* | 9/2006 | Biggs | H01H 1/0036 |
| | | | 60/527 |
| 2008/0006353 A1* | 1/2008 | Elzey | F16F 7/121 |
| | | | 148/563 |
| 2009/0008973 A1* | 1/2009 | Browne | B60N 2/806 |
| | | | 297/216.12 |
| 2009/0218858 A1* | 9/2009 | Lawall | B60N 2/99 |
| | | | 297/216.1 |
| 2015/0202993 A1 | 7/2015 | Mankame et al. | |
| 2019/0232842 A1 | 8/2019 | Boccuccia et al. | |
| 2020/0247274 A1 | 8/2020 | Gandhi et al. | |

OTHER PUBLICATIONS

Strittmatter et al., "Intelligent materials in modern production—Current trends for thermal shape memory alloys," Procedia Manufacturing, vol. 30, pp. 347-356, 2019.

Chris Shunk, "GM awarded DOE money to research Shape Memory Alloy heat engines," Autoblog, 2 pages, Nov. 2, 2009.

Mark Gummin, "Shape memory alloy massage for seating surfaces," 3 pages, Jun. 15, 2018, found at https://contest.techbriefs.com/2018/entries/consumer-products/8871.

* cited by examiner

ACTUATOR FOR A SUPPORT SYSTEM OF A SEAT

TECHNICAL FIELD

The subject matter described herein relates, in general, to actuators, and, more particularly, to actuators using memory alloys for a support system of a seat.

BACKGROUND

An actuator is a machine component that may control a mechanism to move in a system. For example, an actuator may open a valve, close a mechanical switch, regulate flow, and so on. Some actuators operate by using a power convertor to convert energy, such as electrical energy, into a mechanical force. Solenoids or electric motors are electromagnetic actuators that use electricity to operate a mechanical load. Pneumatic actuators use air to operate a mechanical load. In addition, a system may use a controller to ensure the correct functioning of input quantities and output action by solenoid, electric motor, or pneumatic actuators.

Moreover, systems using actuators are becoming smaller and lighter. Solenoids, electronic motors, and other actuators are needed to meet certain size and weight parameters of a mobile device, vehicle, and so on. However, these actuators may be too bulky and heavy for certain applications. Furthermore, battery usage of a mobile device or vehicle may be impacted by the materials and design of actuators. For example, actuators in auxiliary systems of an electric vehicle may impact range during increased usage of windows, seat controls, and so on. Thus, certain actuators may be bulky, heavy, or inefficient particularly for use in electric vehicles.

SUMMARY

In one embodiment, example systems and methods relate to a manner of improving an actuator used in a vehicle to support parts of a seat. In various implementations, actuators may decrease battery power available for other functions in a vehicle. Furthermore, actuators may also be bulky and mechanical, thereby adding weight to a vehicle and increasing manufacturing costs for a seat. Accordingly, an actuator may have a design that uses materials and a purpose-built body that is bi-stable to reduce power consumption and weight for a support system of a vehicle seat. In particular, a wire and a strip made of a memory alloy (MA) on the body may uncoil and coil using heat, thereby reshaping parts of the seat for support. The MA is lighter than a motor and remains in a state or shape without additional energy. In this way, the actuator in the seat is lighter and uses less power to support and provide comfort to an occupant.

In one embodiment, an actuator includes a body that is bi-stable with a coiled state and an uncoiled state. The actuator also includes a strip, coupled to the body, that coils the body according to heat caused by a power source. The actuator also includes a wire coupled to a side of the body opposite from the strip and the wire uncoils the body in response to heating caused by the power source.

In one embodiment, an actuator includes a bi-stable body with an active state and an inactive state. The actuator also includes a MA component, coupled to the bi-stable body, springing the bi-stable body into the active state according to heat. The actuator also includes a MA strip coupled to a side of the bi-stable body opposite from the MA component and the MA strip causes the bi-stable body to enter the inactive state in response to heating.

In one embodiment, an actuator system includes bi-stable actuators. The actuator system also includes MA components, coupled to two or more of the bi-stable actuators, that separately spring the two or more bi-stable actuators into an active state according to heat. The actuator system also includes MA strips, coupled to the two or more bi-stable actuators, that separately cause the two or more bi-stable actuators to enter an inactive state in response to heating, wherein a controller activates the heating to enter the inactive state.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments associated with improving an actuator for a support system of a seat are disclosed herein. An actuator may use lightweight and compact memory alloys (MA) in bolsters or a headrest to adjust the comfort of a seat in a vehicle. For example, the actuator may morph or change shape to increase comfort to the occupant of the seat. In one approach, the body of the actuator may be a metal that is bi-stable with a coiled state and an uncoiled state triggered by a controller. The controller adjusts the bolsters or the headrest in a seat using the bi-stable metal. In particular, a power source may be activated by the controller to heat a strip composed of a MA or a shape memory alloy (SMA) to spring the body into the coiled state. In this way, the controller may remotely increase force to shape the bolsters or headrest using the coiled state, thereby providing support to the occupant. Moreover, the coiled body and strip may maintain a stable shape without additional heating or energy, benefiting systems with limited energy (e.g. electric vehicles).

Furthermore, the controller may automatically uncoil a wire on the side of the body opposite from the strip by activating heating through the voltage applied by the power source. In particular, the wire may contract from the heat causing the body to straighten and enter the uncoiled state. Accordingly, the uncoiled body reduces force and may straighten the bolsters or headrest to change support for the occupant. The uncoiled body and wire may maintain a stable shape without additional heat or energy. Thus, the actuator using MAs may be smaller, lighter, and more energy-efficient than solenoid actuators, thereby improving systems particularly in electric vehicles.

Figure 1A:
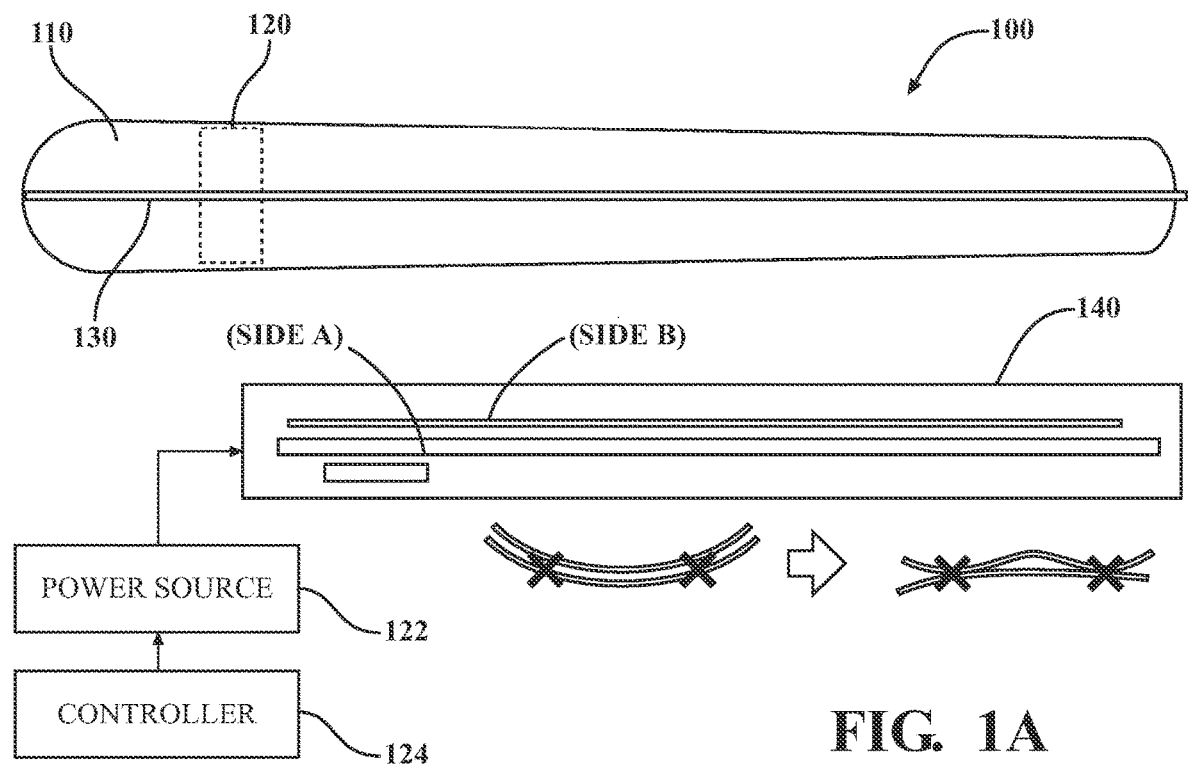
FIG. 1A illustrates one embodiment of an actuator that is bi-stable and includes memory alloy (MA) or shape memory alloy (SMA) components.

FIG. 1A illustrates one embodiment of an actuator 100 that is bi-stable and includes MA or SMA components. The body 110 of the actuator 100 may be a strip composed of metal, steel, composite, and so on arranged in a substantially thin shape to be lightweight and bi-stable. For example, a bi-stable arrangement may comprise the body transitioning into a coiled state or uncoiled state. A bi-stable arrangement may also comprise the body transitioning into an active state when bent or inactive state when substantially flat. In one approach, the outer layer of the body 110 may be covered in plastic, silicon, composite, cloth, and so on material. Regarding actuation, the body 110 may cause mechanical stimulus from a springing or recoiling action. Furthermore, the body 110 may be a strip that is substantially elongated, rectangular, tapered, or the like according to packaging parameters such as length, width, depth, or weight.

Moreover, the actuator 100 may include MA or SMA components for substantially coiling or uncoiling the body 110. A MA or SMA material is lightweight and compact resulting in more basic packaging than a solenoid, pneumatic, and so on based actuation. For example, a MA or SMA component may be 50%-60% lighter than similar components and readily controlled through low voltage and current flow. Regarding composition, nickel, titanium, tungsten, or another metal alloy may be used for the MA or SMA component.

Moreover, the component 120 may be a strip composed of MA or SMA material that contracts when heated by a power source 122 to spring, recoil, or trigger the body 110 into the coiled state. The component 120 may be positioned at an end of the body 110. When heated, the component 120 may contract. Conversely, the component may expand through cooling. The power source 122 may be a circuit that applies voltage when activated by a controller 124 to opposite ends of the component 120. In one approach, a MA or SMA material may contract, shrink, deform, bend, stretch, expand, form a shape, and so on according to parameters such as the amount of material, length, area, density, and so on of the component 120. For example, a voltage level of 2V-12V causes current flow for electric heating of the MA or SMA to 60° C.-90° C. with a reaction time for contraction or actuation that varies according to the parameters.

Figure 1B:
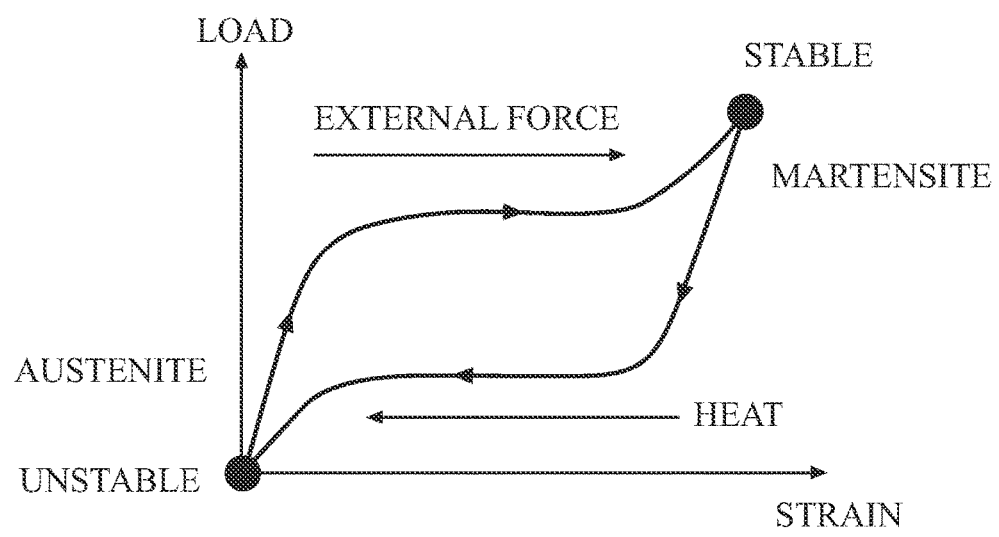
FIG. 1B illustrates the thermodynamic properties of a MA or a SMA.

Regarding changes in shape, phase, or activity, FIG. 1B illustrates the thermodynamic properties of a MA or a SMA. The heating may cause a phase change of the MA or SMA from martensite to austenite at a rate according to the parameters such as length, area, density, and so on. A martensite phase is a reversible transformation of a crystalline structure related to the cooling of a MA or SMA. Correspondingly, the cooling of the MA or SMA to the martensite phase may cause a decrease of density. The martensite phase may handle higher loads or strains than the austenite phase, thereby being more applicable for certain static applications.

Moreover, the component 120 heats beyond a certain threshold when a power source applies voltage. In response, the MA or SMA enters the austenite phase having increased density. For example, the austenite phase may be denser than the martensite phase by approximately 1.08 times. The MA or SMA may maintain or remain in the austenite phase in a certain shape or form without further heating or energy from the power source 122. However, an external force may cause or trigger a transition from the austenite to martensite phase since austenite may be a substantially unstable state.

Furthermore, a MA or SMA may change up to 8% from an original shape, such as by contraction. The MA or SMA material through the shape change may provide actuation by an elastic modulus of up to 70 giga pascals (GPa) of pressure or force. Therefore, the actuator 100 may provide output or force greater than a solenoid actuator at up to ⅓ the amount of steel. The actuator 100 may use MA or SMA material at a volume of up to 6 grams/centimeters (cm)^3 that is similar to steel.

In the actuator 100, the component 130 may be a wire, flat body, strip, or other MA or SMA material that substantially flattens or straightens the body 110 from a substantially coiled, bent, stretched, rounded, curled, and so on shape when heated by voltage from the power source 122. For example, a wire that is compact at 0.1 millimeters (mm)-0.5 mm may result in a lightweight and basic form for the actuator 100. The component 130 may couple to the ends of the body 110. In one approach, the power source 122 may be a circuit that applies voltage at the ends of the body 110 to the component 130 to cause current flow and heating. As the component 130 heats, the MA or SMA material contracts causing the body to substantially flatten or straighten. Referring to the view 140, in one approach the component 120 may be on Side A and the component 130 on an opposite Side B.

Figure 2:
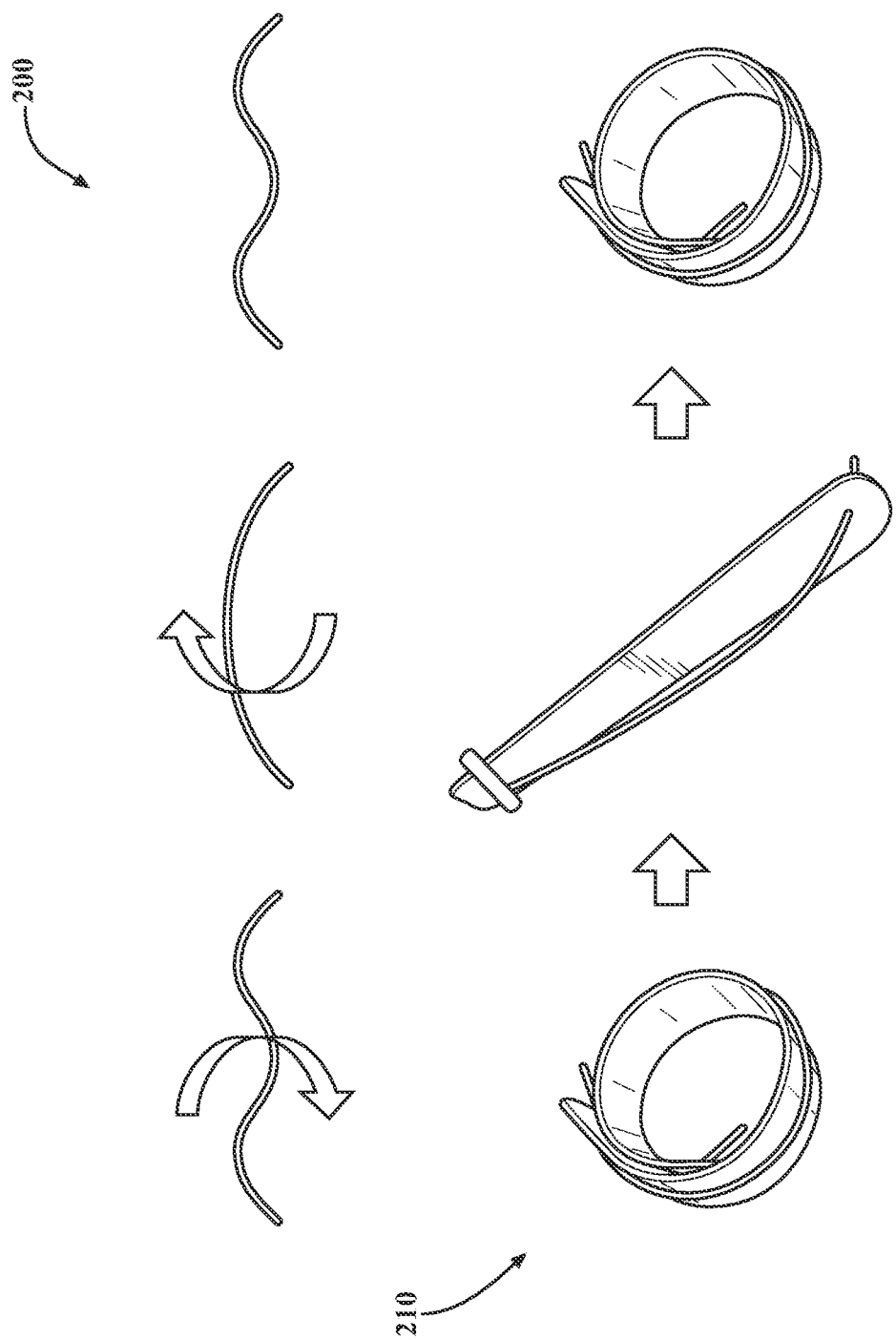
FIG. 2 illustrates an example of a bi-stable actuator with a coiled state and an uncoiled state.

FIG. 2 illustrates an example of a bi-stable actuator 200 with a coiled state and an uncoiled state. The bi-stable actuator 200 may transition from states 210 according to heating or cooling. For example, heating the component 130 may cause the bi-stable actuator 200 to transition from a substantially coiled, bent, stretched, rounded, curled, and so on shape to a substantially flattened or straightened shape. In one way, the transition of the bi-stable actuator 200 may be similar to a cantilever, where the MA or SMA applies a force to substantially the center of the body 110. The rate of flattening or straightening may depend on the MA or SMA material and parameters. For example, the parameters may be length, area, density, and so on. Heating the component 120 may cause the bi-stable actuator 200 to revert or reverse to a substantially coiled, bent, stretched, rounded, curled, and so on shape. Furthermore, the bi-stable actuator 200 may remain or maintain actuation in a shape without additional heating, energy, or power to the MA or SMA components.

Figure 3A:
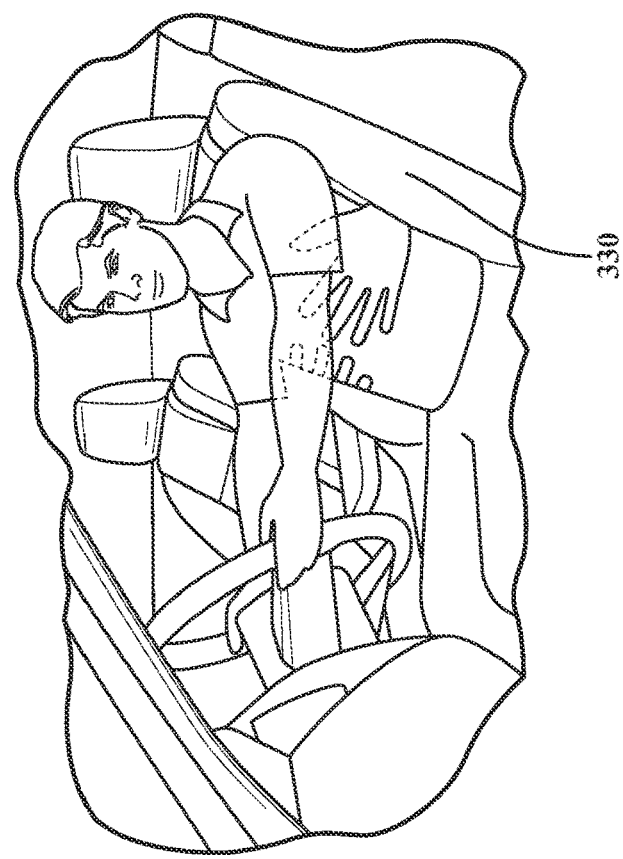
FIGS. 3A and 3B illustrate embodiments of a system using actuators to bolster a seat or adjust a headrest.
Figure 3A:
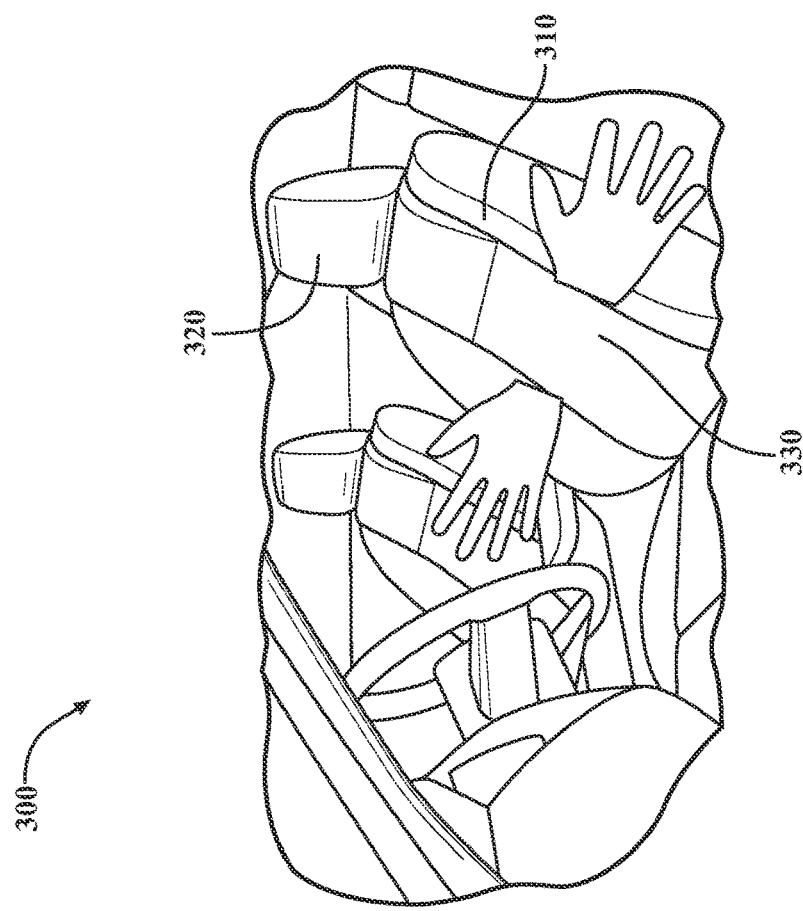

Turning to FIG. 3A, one embodiment of a system 300 using actuators to bolster a seat or adjust a headrest is illustrated. Although the system 300 is configured in a vehicle, the actuator 100 may be used to adjust the comfort for an occupant of any seat such as an office chair, recliner, theater seat, and so on. In the examples given herein, the bolsters 310 or the headrest 320 may buttress, strengthen, support, cushion, reinforce, boost, buoy, prop, brace, and so on an occupant in a seat. In addition, the bolsters 310 may reduce actuation noise, physical size, and weight using the actuator 100. Regarding composition, the thickness of the body 110 may be associated with the material and thickness of the padding used by the bolsters 310 or the headrest 320.

Moreover, the system 300 may independently control multiple units of the actuator 100 embedded in the bolsters 310 or the headrest 320 of a vehicle seat 330. The body 110 of the actuator 100 may be substantially uncoiled, straight, or flat in the uncoiled state without an occupant on the vehicle seat 330. The body 110 may stay in the uncoiled state without applied power by power source 122 thereby increasing efficiency. In this way, the bolsters 310 or the headrest 320 are in an open position without using energy. When the system 300 detects an occupant on the vehicle seat 330 or proximate to the headrest 320, the controller 124 may activate one or more units of the actuator 100 by the power source 122 applying a minimum voltage to heat the component 120. Regarding proximity sensing, the system 300 may use ultrasonic, optical, pressure, heat, magnetic, and so on based sensor(s).

Figure 3B:
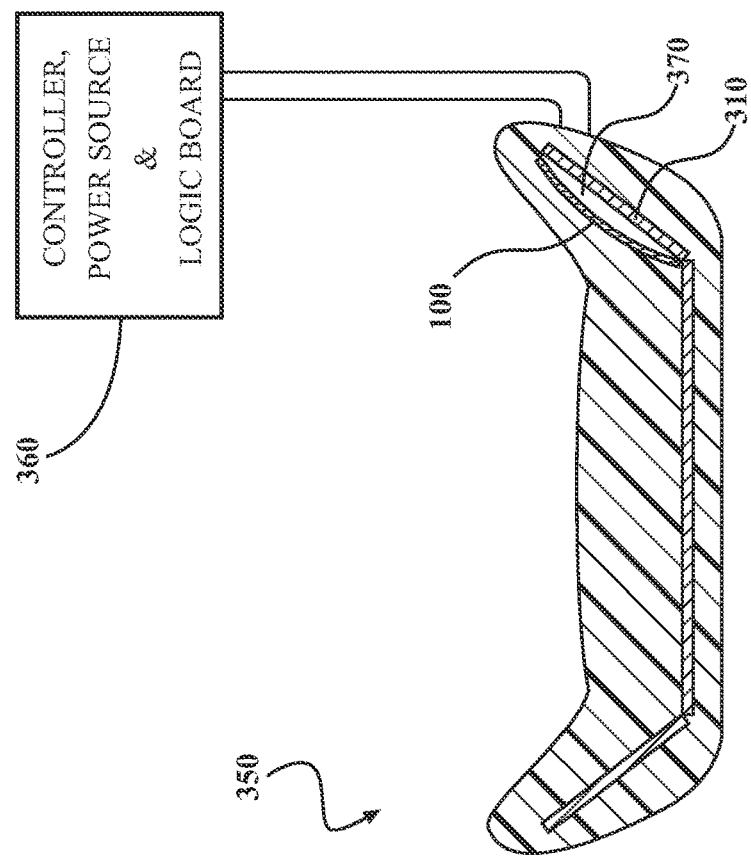
Figure 3B:
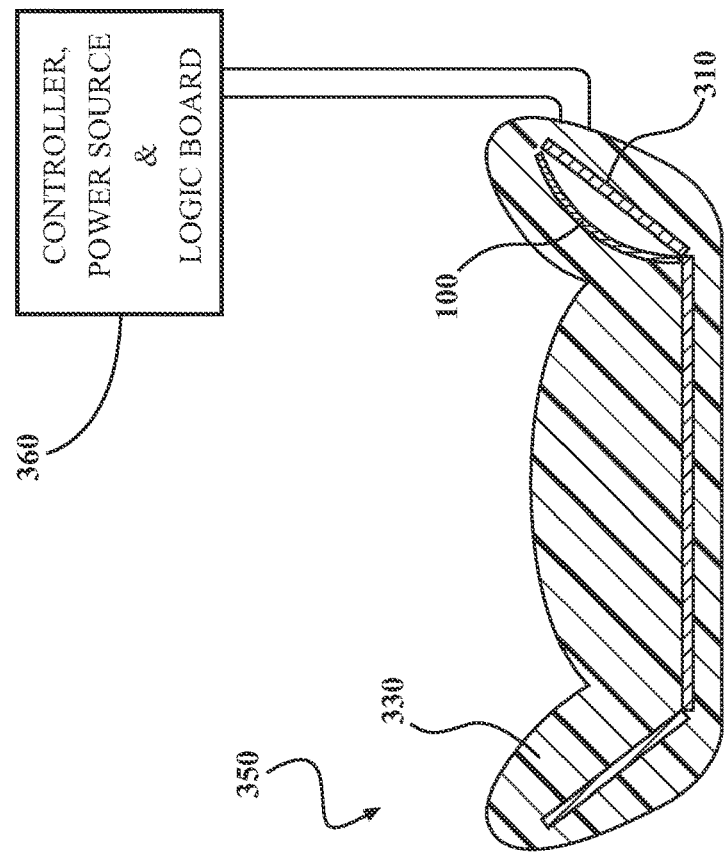

Turning now to FIG. 3B, the system 300 is illustrated from a top view 350. Here, a controller, power source, and logic board 360 may power the actuator 100. As the actuator 100 is powered and the component 120 heated, the bolsters 310 may enter the state 370. In the state 370, the vehicle seat 330 provides lateral support for an occupant without relying on bulky actuator systems such as air pumps, thereby reducing weight and size for the vehicle seat 330.

In another example, the system 300 may also activate the actuator 100 according to vehicle motion. For example, during acceleration or braking the system 300 may activate the actuator 100 to cause the bolsters 310 and the headrest 320 to substantially adjust or conform around parts of the body and head of the occupant. In one approach, the body 110 may be composed of a material that springs or recoils with a tension or stiffness that corresponds to an average human body weight or head providing adequate support. Moreover, the system 300 may similarly set or fix a comfort level using one or more of the actuators 100 according to the shape or weight of an occupant.

Furthermore, the bolsters 310 may increase the force or pressure to enter a hugged or supported stage for the occupant with the body 110 in the substantially coiled, bent, stretched, rounded, curled, and so on shape. The supported stage may be a position where the weight of the occupant is balanced with the force of the bolsters 310 from the actuation. In one approach, once the bolsters 310 or the headrest 320 are in the position, the controller 124 may deactivate the power source 122 and thereby the applied voltage leaving the multiple units of the actuators in a passive or coiled state. In addition, the system may adjust the support or stiffness of the bolsters 310 or the headrest 320 according to the weight distribution of an occupant or a tension level of a seat belt. In this way, the system 300 improves operating a vehicle by adapting comfort to driving conditions and various types of occupants.

Concerning driver performance, the system 300 may improve driver performance or reduce motion sickness by independently or separately controlling the multiple units of the actuator 100. As provided above, the bolsters may support lateral movement and certain inertia changes of an occupant using up to 70 GPa of pressure or force. For example, an operator may command the system 300 to reduce excess motion at certain speeds. Accordingly, the controller 124 may change the tension or stiffness of a subset of actuators in the vehicle seat 330 to improve comfort by reducing lateral motion.

Figure 4:
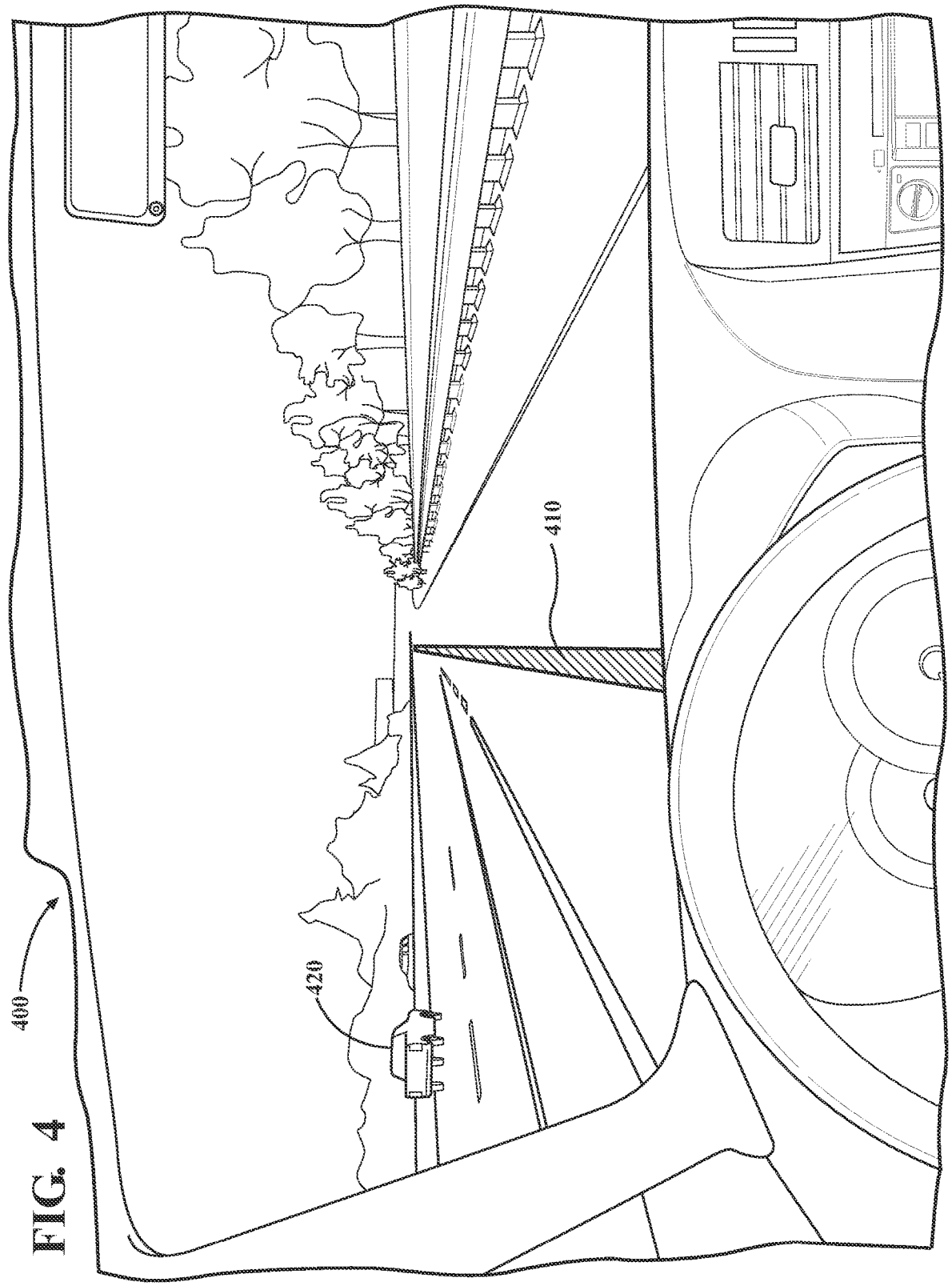
FIG. 4 illustrates a vehicle adjusting comfort to an occupant of the seat while driving.

In FIG. 4, a vehicle 400 adjusting comfort to an occupant of a seat while driving is illustrated. A vehicle 400 may travel on the road 410 having a truck 420. The vehicle 400 may control multiple units of the actuator 100 embedded in the bolsters or the headrests of one or more seats in the vehicle 400. One or more of the multiple units may be individually or separately controlled by the controller 124 to provide custom comfort by changing the tension or stiffness of each actuator 100. Regarding composition, the thickness of the body 110 may be associated with the material and thickness of the padding used in the bolsters or the headrests of a seat in the vehicle 400.

In the vehicle 400, an occupant of a seat may send a command to activate the controller 124 to adjust the bolsters and a headrest by the power source 122 applying a minimum voltage to heat the component 120. The body 110 of the actuator 100 may be composed of a bi-stable metallic material such that heating the component 120 causes the body 110 to transition to a coiled, bent, stretched, rounded, curled, and so on shape that applies pressure to a body part of the occupant. In one approach, the occupant may adjust the bolsters and headrest according to road conditions. For example, the power source 122 may apply voltage at the ends of the body 110 to the component 130 to cause current flow and heating. As the component 130 heats, the MA or SMA material contracts causing the body to substantially flatten or straighten, thereby adjusting a comfort level in a vehicle seat. In this way, the vehicle 400 improves comfort for occupants by allowing independent control of the bolsters and the headrest of a seat.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Aspects herein can be embodied in other forms without departing from the spirit or essential attributes thereof. Accordingly, reference should be made to the following claims, rather than to the foregoing specification, as indicating the scope hereof.

What is claimed is:

1. An actuator comprising:
    a body that is bi-stable with a coiled state and an uncoiled state;
    a strip, coupled to the body, that coils the body according to heat caused by a power source and the body supports a user by applying a force; and
    a wire coupled to a back of the body opposite from the strip and the wire uncoils the body according to heat caused by the power source.

2. The actuator of claim 1, wherein the wire contracts from the heating and the body is stable in the uncoiled state without further heating to the wire.

3. The actuator of claim 1, wherein the body applies the force when the strip coils the body, according to the power source, to engage a bolster of a seat.

4. The actuator of claim 3, wherein the body reduces the force when the wire uncoils the body according to the power source.

5. The actuator of claim 1, wherein the body applies the force when the strip coils the body, according to the power source, to engage and change shape of a headrest for support in a seat.

6. The actuator of claim 1, wherein the body is a bi-stable strip and the wire extends from ends of the bi-stable strip.

7. The actuator of claim 1, wherein a controller deactivates the power source to the strip and the body is stable in the coiled state.

8. The actuator of claim 1, wherein any one of the wire and the strip is a metal alloy that changes to a shape and maintains the shape for memory.

9. The actuator of claim 1, wherein the strip is positioned at an end of the body.

10. An actuator comprising:
    a bi-stable body with an active state and an inactive state;
    a memory alloy (MA) component, coupled to the bi-stable body, springing the bi-stable body into the active state according to heat, wherein the bi-stable body supports a user by applying a force; and
    a MA strip coupled to a back of the bi-stable body opposite from the MA component and the MA strip causes the bi-stable body to enter the inactive state according to heat.

11. The actuator of claim 10, wherein the MA strip contracts in response to the heating and the bi-stable body is stable in the inactive state without further heating.

12. The actuator of claim 10, wherein the bi-stable body applies the force from the springing to engage a bolster of a seat.

13. The actuator of claim 12, wherein the bi-stable body reduces the force when the bi-stable body enters the inactive state.

14. The actuator of claim 10, wherein the bi-stable body applies the force from the springing to engage and change shape of a headrest for support in a seat.

15. The actuator of claim 10, wherein the MA strip extends from ends of the bi-stable body.

16. The actuator of claim 10, wherein a controller deactivates the heating to the MA component and the bi-stable body is stable in the active state.

17. The actuator of claim 10, wherein the MA component is positioned at an end of the bi-stable body.

18. An actuator system comprising:
    bi-stable actuators;
    memory alloy (MA) components, coupled to two or more of the bi-stable actuators, that separately spring the two or more bi-stable actuators into an active state according to heat, wherein the two or more bi-stable actuators support a user by applying force; and
    MA strips, coupled to backs of the two or more bi-stable actuators, that separately cause the two or more bi-stable actuators to enter an inactive state according to heating, wherein a controller activates the heating to enter the inactive state.

19. The actuator system of claim 18, wherein the two or more bi-stable actuators apply the force from springing into the active state that increases support in a bolster of a seat.

20. The actuator system of claim 18, wherein the two or more bi-stable actuators apply the force from springing into the active state and changes shape of a headrest for support in a seat.

* * * * *